Nov. 6, 1934.    P. J. NEILON    1,979,400
DISTRIBUTING PIPING FOR SPRINKLER SYSTEMS
Filed May 16, 1930    2 Sheets-Sheet 1
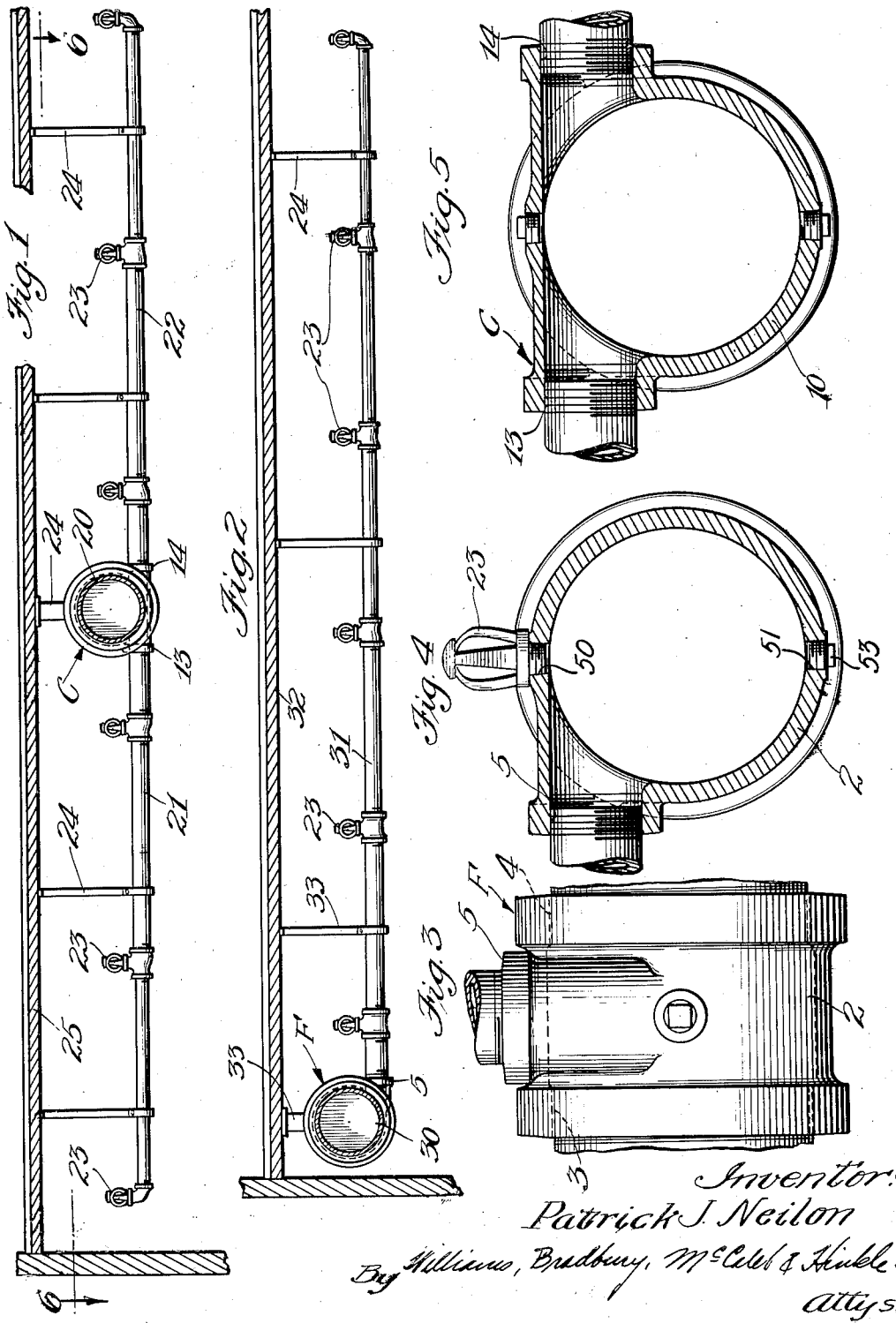

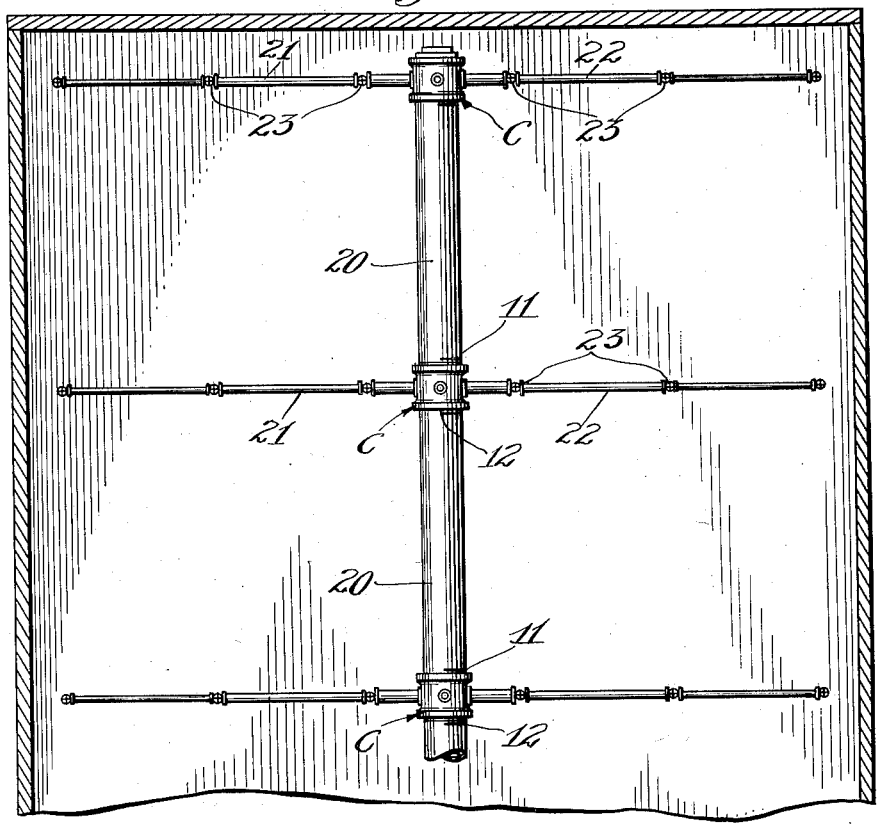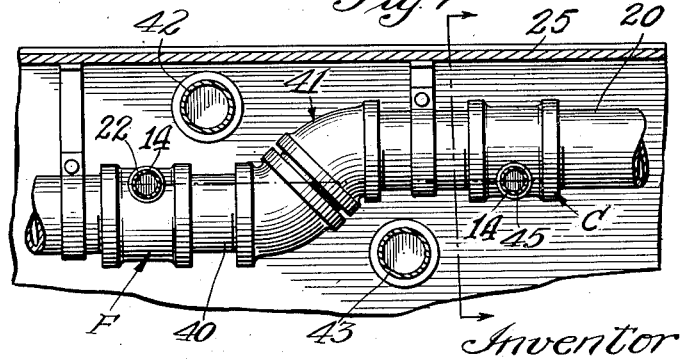

Patented Nov. 6, 1934

1,979,400

UNITED STATES PATENT OFFICE 1,979,400

DISTRIBUTING PIPING FOR SPRINKLER SYSTEMS

Patrick J. Neilon, Cleveland, Ohio, assignor to The Grabler Manufacturing Company, Cleveland, Ohio, a corporation of Ohio Application May 16, 1930, Serial No. 452,866

3 Claims. (Cl. 169—16)

The invention relates to the installation of a piping system and more particularly to the installation of a piping system associated with an automatic sprinkler system.

An object of my invention is the provision of fittings assembled at predetermined intervals in the main supply line of a sprinkler system whereby the branch lines extending laterally from these fittings may be positioned above the axis of the main line and below the axis of the main supply, yet maintain the branch line axes in the same plane relative to each other.

The foregoing features, as well as others of the invention not particularly pointed out above, will be more particularly pointed out in the ensuing specification and appended claims.

Referring now to the drawings, in which like reference characters in the several views denote like parts and in which, Fig. 1 is a view taken along the line indicated by the arrows in Fig. 7 and illustrates in front elevation a main supply line of a sprinkler system with oppositely extending branch lines connected to cross fittings in the main line and showing such branch lines located below the center line or axis of the main supply line;

Fig. 2 is a view similar to Fig. 1, with a T fitting in the main line with the laterally extending branch line connected to the T fitting and showing such a branch line located below the center line or axis of the main line;

Fig. 3 is a plan view of a T fitting in which the branch outlet of the same is located eccentrically relative to the axis of the main outlets of the T fitting;

Fig. 4 is a transverse section of the T fitting used in Fig. 2, showing the location of the eccentric branch outlet with relation to the main outlets of the same;

Fig. 5 is a transverse section of a cross fitting used in Fig. 1, showing the location of the eccentric diametrically opposite branch outlets with relation to the main outlets of the same;

Fig. 6 is a sectional plan view along the line 6—6 of Fig. 1 and looking in the direction of the arrows; and Fig. 7 is a side elevation of a portion of a main supply line showing my invention in detail, wherein the application of a T fitting in the main supply line includes an offset therein for clearing obstructions.

An automatic sprinkler system as is well known is installed in a building for protective measures against fire and comprises essentially a power pump, risers extending therefrom, main supply lines leading from the risers, and branch lines which extend laterally from the main supply lines and carry the usual sprinkler heads. These main supply lines and their branch lines are suspended from the ceiling a predetermined distance and in sprinkler installations of this type the width or area to be covered by the branch lines for a particular main supply line determines the position of the main supply line with relation to the area to be covered. In instances where the area to be covered by the branch lines is of considerable width the main supply line is located centrally with respect to the opposite walls of such area and through the medium of cross fittings which are distributed or spaced at predetermined intervals in the main supply line, the branch lines which extend laterally in opposite directions from these cross fittings toward the respective walls carry sprinkler heads which in case of fire operate in the well-known manner. In instances where the width or area to be covered by the branch lines is such that the branch supply lines from only one side of the main supply line are necessary to sufficiently cover the area, the main supply line may be located adjacent to one of the walls enclosing such an area. Through the medium of T fittings spaced at predetermined intervals in the main supply line, branch lines extend laterally from the T fittings toward the opposite wall.

These main supply lines and their branches extending at right angles thereto as already pointed out, are suspended from the ceiling a predetermined distance which, as is readily apparent, reduces the ceiling height or head room an appreciable amount. In some instances this reduction of ceiling height or head room is not an important factor but in a great many cases the maximum ceiling height or head room is most important. This is especially true in buildings used for manufacturing purposes as the available height or head room is most important from the standpoint of machinery installation.

Referring to the structure of the eccentric T fitting illustrated in Fig. 3, this fitting F as shown, comprises a main body portion 2 including the diametrically opposite main outlets 3 and 4 and the eccentrically branched outlet 5. This branch outlet 5, the axis of which is at right angles to the axis of the main outlets 3 and 4, is eccentrically disposed relative to the axis of the main outlets 3 and 4, as clearly illustrated in Fig. 4. This eccentric position of the branch outlet 5 relative to the main outlets 3 and 4 permits the same to be positioned either above or below the center line or axis of the main supply line, but the relationship between the main supply line and the branch outlet 5 is of course dependent upon the manner in which the T fitting is assembled in the main supply line, as will be more fully hereinafter described.

A cross fitting C is shown in section in Fig. 5 and comprises a main body portion 10 and its diametrically opposite main outlets 11 and 12, and the diametrically opposite branch outlets 13 and 14 which are at right angles to the main outlets 11 and 12. The branch outlets 13 and 14 are eccentrically disposed with relation to the axes of the main outlets 11 and 12 as clearly shown in Fig. 5.

The fitting C may also be assembled in a main supply line with its branch outlets 13 and 14 positioned above or below the center line or axis of the same, the relationship between the main supply line and the branch outlets of the fitting C being of course dependent upon the manner in which the cross fitting C is assembled in a main supply line as will presently be described.

Having described the structure of the eccentric T fitting F and cross fitting C, a description of their assembly in the main supply line of a sprinkler system and the advantage and economy as to the number of fittings used in a system equipped with this type of fitting, will now be described.

Referring to Fig. 1, a typical sprinkler system is illustrated in which the main supply line 20 has connected thereto the oppositely extending branch lines 21 and 22 which support the sprinkler heads 23 on suitable reducing T fittings, as is well understood. In Fig. 1 I have shown the cross fitting C above referred to assembled in the main supply line 20 and as illustrated in Fig. 6, these cross fittings C are assembled in the main supply line at predetermined intervals. The cross fittings C are connected in the main supply line 20 so as to locate the eccentrically disposed branch outlets 13 and 14 of the same below the center line or axis of the main supply line 20 which, as is readily apparent, also locates the oppositely extending branch lines 21 and 22 connected to the branch outlets 13 and 14 below the axis of the main supply line 20.

In Fig. 2 I illustrate the use of a T fitting F assembled in a main supply line 30 and from which extends laterally the branch lines 31. The T fittings F are connected in the main supply line 30 so as to locate the eccentrically disposed branch outlets 5 below the center line or axis of the main supply line which, as is readily apparent, also locates the laterally extending branch lines 31 connected to the eccentric branch outlets 5 below the center of the main supply line 30.

Referring to Fig. 7, I show a portion of a main supply line 20 provided with an offset 41 to avoid obstructions 42 and 43 which lie adjacent the ceiling 44. This offset 41 locates the axis of that portion of the main supply line 20 to the left of the same below the axis of that portion of the main supply line 20 extending to the right of the offset 41.

A T fitting F is shown to the left of the offset 41 and one to the right of the same. By locating the eccentric branch outlet 14 of the T fitting at the left of the offset 41 above the center line or axis of this portion of the main supply line 20, and locating the eccentric branch outlet 14 of the T fitting at the right of the offset 41 below the center line or axis of this portion of the main supply line 20, the axes of the laterally extending branch lines 22 are thus maintained in the same plane to permit the branch lines to remain a predetermined distance from the ceiling 25. The above description has reference to a T fitting F but it is readily understood that a cross fitting such as C, may also be reversed in the manner just described.

The T fitting illustrated in Fig. 4 is provided with a pair of diametrically opposite tapped orifices 50 and 51 for the reception of a sprinkler head, but the connection of a sprinkler head with either of the tapped orifices 50 and 51 is of course dependent upon the manner in which the T fitting is assembled in the main line. As shown, the orifice 50 has secured therein a sprinkler head 23 while the orifice 51 is closed by a suitable plug 53.

Having described my invention, what I claim and desire to secure by United States Letters Patent is as follows:

1. A sprinkler system of the class described comprising a main supply line, branch fittings in said main line including axially aligned main outlets for connection with said main line, and axially aligned branch outlets eccentrically disposed with relation to said main outlets, fluid distributing means connected in said branch outlets, offset fittings in said main line disposed to position the axis of a portion of the main line in a plane below the plane of the axis of another portion, said branch fittings being connected in the main line at opposite sides of said offset fittings, and so disposed to position all of the fluid distributing means in a single plane.

2. A sprinkler system of the class described comprising a main supply line, branch fittings in said main line including axially aligned main outlets for connection with said main line, and axially aligned branch outlets eccentrically disposed with relation to said main outlets, fluid distributing means connected in said branch outlets, offset fittings in said main line disposed to position the axis of a portion of the main line in a plane below the plane of the axis of another portion, said branch fittings being connected in the main line at opposite sides of said offset fittings, and being so disposed as to position all of said fluid distributing means in a single horizontal plane between the planes of the offset portions of the main line axis.

3. A sprinkler system of the class described comprising a main supply line, offset fittings in said main line disposed to position portions of the axis of the main line in vertically spaced horizontal planes, branch fittings in said main line including main line outlets for connection with the main line and branch line outlets eccentrically disposed relative to the main line outlets, and branch lines, including fluid sprinkling means, connected in said branch outlets, said branch fittings being so disposed to position all of the branch lines in a plane between the spaced planes in which the offset portions of the main line axis are disposed.

PATRICK J. NEILON.